US010499481B1

(12) United States Patent
Bradford (10) Patent No.: US 10,499,481 B1
(45) Date of Patent: Dec. 3, 2019

(54) LED LIGHTING DEVICE WITH LED BOARD ON NETWORK

(71) Applicant: Cree, Inc., Durham, NC (US)

(72) Inventor: Everett Bradford, Apex, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 15/987,965

(22) Filed: May 24, 2018

(51) Int. Cl.
H05B 37/02 (2006.01)
H05B 33/08 (2006.01)

(52) U.S. Cl.
CPC ....... *H05B 37/029* (2013.01); *H05B 33/0845* (2013.01); *H05B 33/0857* (2013.01); *H05B 37/0218* (2013.01); *H05B 37/0272* (2013.01)

(58) Field of Classification Search
None
See application file for complete search history.

(56) References Cited

U.S. PATENT DOCUMENTS

| 7,213,940 | B1 | 5/2007 | Van De Ven et al. |
| 7,614,759 | B2 | 11/2009 | Negley |
| 8,476,836 | B2 | 7/2013 | van de Ven et al. |
| 8,736,186 | B2 | 5/2014 | Chobot |
| 8,742,671 | B2 | 6/2014 | van de Ven et al. |
| 8,791,641 | B2 | 7/2014 | van de Ven et al. |
| 8,810,144 | B2 | 8/2014 | Hu et al. |
| 8,823,271 | B2 | 9/2014 | van de Ven et al. |
| 8,829,821 | B2 | 9/2014 | Chobot et al. |
| 8,912,735 | B2 | 12/2014 | Chobot et al. |
| 8,975,827 | B2 | 3/2015 | Chobot et al. |
| 9,049,753 | B1 * | 6/2015 | Wassel .................. H05B 37/02 |
| 9,101,021 | B2 | 8/2015 | Lys |
| 9,131,561 | B2 | 9/2015 | Athalye |
| 9,155,165 | B2 | 10/2015 | Chobot |
| 9,155,166 | B2 | 10/2015 | Chobot |
| 9,303,823 | B2 | 4/2016 | Hu et al. |
| 9,433,061 | B2 | 5/2016 | Chobot |
| 9,408,282 | B1 * | 8/2016 | Springer ............ H05B 37/0272 |
| 9,510,413 | B2 * | 11/2016 | Athalye ............... H05B 33/083 |

(Continued)

FOREIGN PATENT DOCUMENTS

WO 2016/019442 2/2016

OTHER PUBLICATIONS

U.S. Appl. No. 61/932,058, filed Jan. 27, 2014.

(Continued)

*Primary Examiner* — Crystal L Hammond
(74) *Attorney, Agent, or Firm* — Myers Bigel, P.A.

(57) ABSTRACT

The lighting device includes a LED board that supports an LED. A communication interface is provided with the LED board. At least one of a dimming control command and a color control command is received at the communication interface on then LED board. The communication interface sends the received control signals to the LED board controller. If the control signal is a dimming control command the LED board controller transmits a driver control signal to the LED driver. The driver adjusts the current delivered to the LED board based on the driver control signal. If a color control command is received the LED board controller adjusts the color of the emitted light by selectively operating different color LEDs as programmed in the LED board controller.

20 Claims, 8 Drawing Sheets

(56) References Cited

U.S. PATENT DOCUMENTS

| | | | |
|---|---|---|---|
| 9,549,448 B2 | 1/2017 | Pope et al. | |
| 9,572,226 B2 | 2/2017 | Motley et al. | |
| 9,622,321 B2 | 4/2017 | Creasman et al. | |
| 9,644,799 B2* | 5/2017 | Crayford | F21K 9/237 |
| 9,730,289 B1 | 8/2017 | Hu et al. | |
| 9,786,639 B2* | 10/2017 | Bergmann | H05B 33/0803 |
| 9,791,110 B2 | 10/2017 | Hu et al. | |
| 9,818,919 B2 | 11/2017 | Lowes et al. | |
| 2007/0013557 A1* | 1/2007 | Wang | B64F 1/20 |
| | | | 340/945 |
| 2010/0156298 A1* | 6/2010 | Takacs | H05B 33/0803 |
| | | | 315/90 |
| 2011/0062868 A1* | 3/2011 | Domagala | F21K 9/233 |
| | | | 315/32 |
| 2011/0095687 A1* | 4/2011 | Jonsson | F21V 23/04 |
| | | | 315/51 |
| 2013/0162153 A1 | 6/2013 | van de Ven et al. | |
| 2013/0322082 A1* | 12/2013 | Hollander | F21S 2/005 |
| | | | 362/249.02 |
| 2014/0001972 A1* | 1/2014 | Harris | H05B 33/0842 |
| | | | 315/200 R |
| 2014/0268790 A1 | 9/2014 | Chobot et al. | |
| 2016/0219794 A1* | 8/2016 | Greenberg | A01G 7/045 |
| 2016/0227631 A1* | 8/2016 | Weedon, III | H05B 37/0272 |
| 2017/0074471 A1* | 3/2017 | Panek | F21S 2/005 |
| 2017/0105265 A1* | 4/2017 | Sadwick | A61N 5/0618 |
| 2017/0142813 A1* | 5/2017 | Sahni | A01G 22/00 |
| 2017/0227172 A1* | 8/2017 | May | F21K 9/272 |
| 2018/0027626 A1 | 1/2018 | Wang et al. | |
| 2018/0110102 A1 | 4/2018 | Adams et al. | |

OTHER PUBLICATIONS

U.S. Appl. No. 62/292,528, filed Feb. 8, 2016.
Notification of Transmittal of the International Search Report and the Written Opinion of the International Searching Authority, or the Declaration corresponding to International Application No. PCT/US2019/032134, dated Jul. 23, 2019.

* cited by examiner

LED LIGHTING DEVICE WITH LED BOARD ON NETWORK

BACKGROUND OF THE INVENTION

The invention relates to lighting devices and, more particularly, to light fixtures, light bulbs, lamps or the like that use solid state lighting sources, such as light emitting diodes (LEDs).

LED lighting systems have advantages over traditional lighting solutions such as incandescent and fluorescent lighting because they use less energy, are more durable, operate longer, can be combined in multi-color arrays that can be controlled to deliver virtually any color light, and contain no lead or mercury. In many applications, one or more LED dies (or chips) are mounted within an LED package or on an LED module, which may make up part of a lighting system, a light fixture, lighting unit, lamp, light bulb or the like which includes one or more drivers or power supplies to power the LEDs. The LEDs can be controlled to set and adjust brightness and dimming levels.

Light of different color hues, or different correlated color temperature (CCT), can be created by combining LEDs with different emission color points. The LEDs with different emission color points can be selectively combined to create virtually any color light. Typically, the lighting system is designed so that each color light source can be managed separately based on the drive current characteristics for that color. The driver is designed to match the configuration of LEDs in the lighting system so that control can be accomplished by using separate color control channels. With such an arrangement, a desired CCT can be maintained at any dimming level or user-configurable CCT can be provided. As one example, an LED lamp can be dimmed following the profile of color vs. brightness exhibited by incandescent lamps.

SUMMARY OF THE INVENTION

In some embodiments a lighting device comprises an LED board comprising a communication interface for communicating with an external lighting control. At least one LED is mounted on the LED board where the LED is operable to emit light when energized through an electrical path. A driver delivers current to the at least one LED via the electrical path.

The communication interface may be one of a DALI interface, a DMX512 interface, a Bluetooth interface, a 0-10V interface, and a wireless interface. At least two LEDs may be provided where selected ones of the at least two LEDS emit light of at least two different colors. At least two groups of LEDs may be provided where a first group of the at least two groups of LEDs emits light of a first color and a second group of the at least two groups of LEDs emits light of a second color. The communication interface may receive at least one of a color control command and a dimming control command. The LED board may transmit a driver control signal to the driver upon receipt of the dimming control command. The drive control signal may comprise one of a 0-10V and a PWM signal. The communication interface may communicate with a RF module. The LED board may comprise a daughter board on which the communication interface is mounted.

In some embodiments a lighting device network comprises a plurality of lighting devices, each of the plurality of lighting devices comprises an LED board comprising a communication interface for communicating with an external control. At least one LED is mounted on the LED board where the at least one LED is operable to emit light when energized through an electrical path. A driver delivers current to the at least one LED via the electrical path.

The communication interfaces of each of the plurality of lighting devices may be connected by a lighting network. A lighting control may communicate with at least one of the plurality of lighting devices over the lighting network. A lighting control may communicate with each of the plurality of lighting devices over the lighting network.

In some embodiments a method of operating a lighting device comprises: transmitting at least one of a dimming control signal and a color control signal to a communication interface on an LED board, the LED board comprising a plurality of LEDs operable to emit light when energized through an electrical path; transmitting a dimming signal to a driver upon receipt of the dimming control command, the driver delivering current to the at least one LED via the electrical path based on the dimming signal.

The method may further comprise transmitting the at least one of a dimming control signal and a color control signal to a second communication interface on a second LED board. The method may further comprise transmitting the at least one of a dimming control signal and a color control signal from the communication interface to a second communication interface on a second LED board.

In some embodiments, a lighting device comprises a communication interface for communicating with an external lighting control. A LED board and at least one LED are mounted on the LED board where the at least one LED is operable to emit light when energized through an electrical path. A controller is on the LED board and the communication interface communicates with the controller. A driver delivers current to the at least one LED via the electrical path. A driver signal interface between the controller and driver transmits driver control signals from the controller to the driver for controlling brightness of the emitted light.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 1800K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Figure 1:
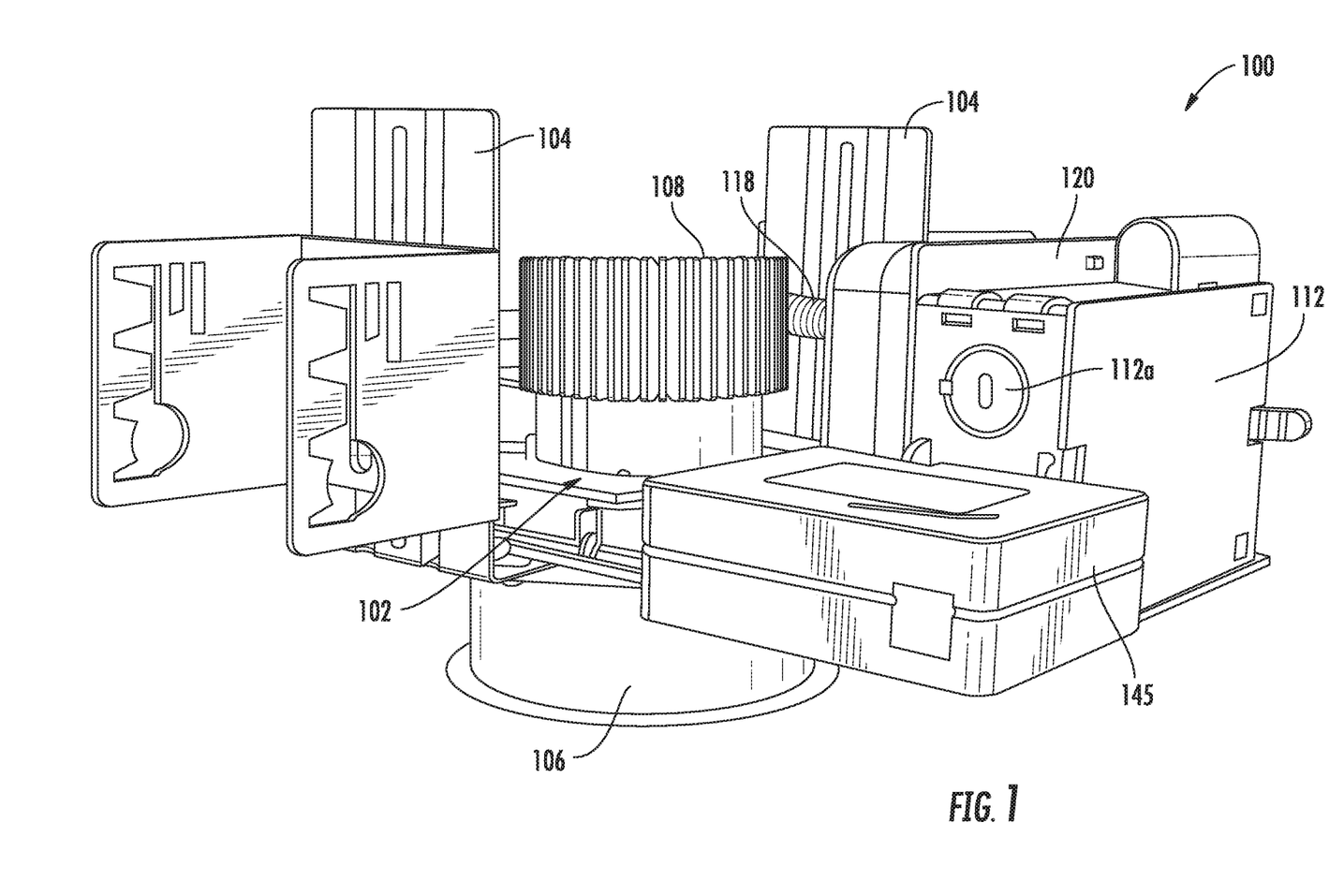
FIG. 1 is a first perspective view of an embodiment of a lighting device in which the invention may be used.
Figure 2:
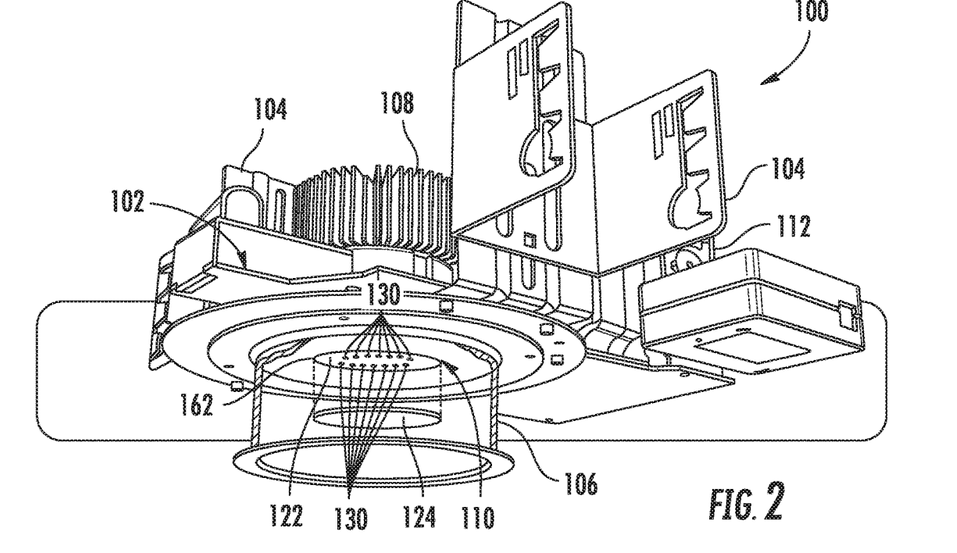
FIG. 2 is perspective partially broken away view of the lighting device of FIG. 1.
Figure 3:
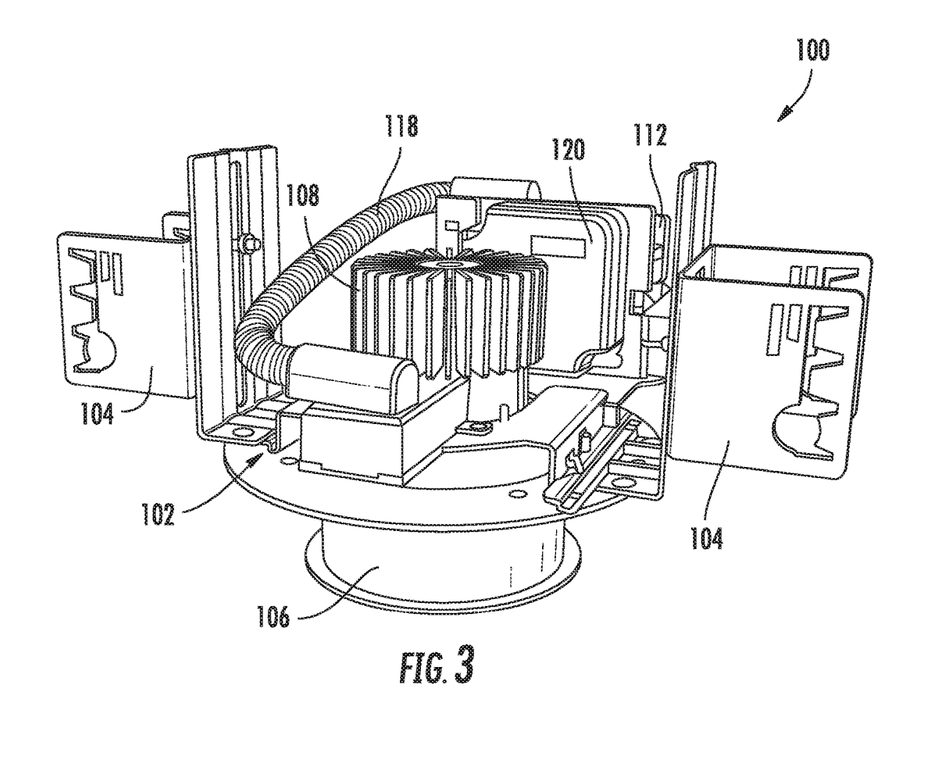
FIG. 3 is a second perspective view of the lighting device of FIG. 1.

Embodiments of the present invention provide a more flexible approach to providing communication to and between solid state lighting devices. The system uses a communication interface on the LED board of an LED assembly that receives light control signals that may be used to control both the color of the light emitted by the LED assembly and the dimming level or brightness of the emitted light. The communication interface 135 transmits the lighting control signal 150 to controller 132 on the LED board 122 to control the color and the brightness of the emitted light. An example embodiment of a lighting device in which the system of the invention may be used is shown in FIGS. 1 through 3. The illustrated lighting device 100 is a recessed downlight that is typically mounted behind a surface such as a ceiling or other structure. While a specific embodiment of a lighting device is illustrated, the system and methods of the invention may be used on any lighting system, light fixture, lighting unit, lamp, light bulb or lighting device (hereinafter collectively "lighting device") that uses remote connectivity to control the lighting device where the benefits of the invention may be realized.

Referring to FIGS. 1 through 3, in one embodiment the lighting device 100 may include a support structure 102 that supports the light engine. In the illustrated embodiment the lighting device 100 is intended to be mounted as a recessed downlight in a ceiling where the support structure 102 includes connection members or brackets 104 that are configured to be mounted to ceiling joists or other supporting structure. The support structure 102 may be mounted directly to the supporting structure or intervening support members may be used between the connection members 104 and the supporting structure. A support ring 106 is disposed in a hole formed in the ceiling or other structure such that light may be emitted from the lighting device through the support ring. The support structure 102 also supports a heat sink structure 108 that is thermally coupled to the LED assembly 110 to dissipate heat from the LEDs 130. The heat sink structure 108 is made of a thermally conductive material and may include fins or other structure to facilitate dissipation of heat therefrom. Heat may be conducted to the heat sink structure 108, away from the LED assembly 110, and dissipated to the ambient environment.

Figure 4:
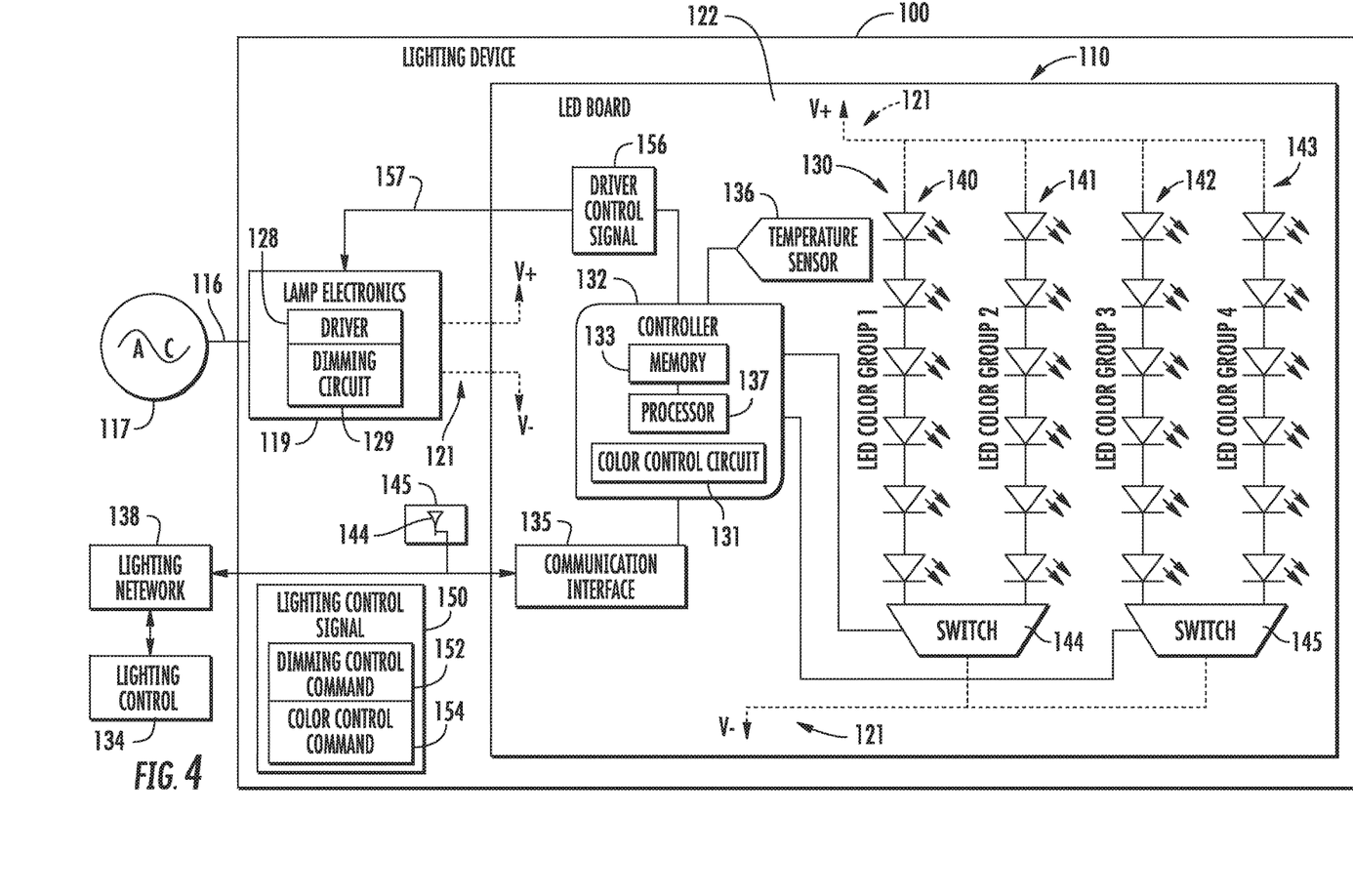
FIG. 4 is a schematic view of an embodiment of a lighting device according to the invention.

Electrical junction box 112 may be supported on or form part of the support structure 102. Junction box 112 receives the electrical feed line 116 from the power source 117 such as the electrical grid of a building as shown in FIG. 4.

Typically, the power source 117 delivers AC current to the lighting device. The feed line 116 may be encased in conduit that is connected to the junction box 112 at a knockout 112a such that the electrical feed line can be fed into the junction box for connection to the lamp electronics. The electrical feed line 116 forms part of the electrical path to the LEDs and delivers critical current to the lamp electronics. The term "electrical path" can be used to refer to the entire electrical path to the LED's, including an intervening driver (also sometimes referred to as a power supply) disposed between the electrical connection that would otherwise provide power directly to the LEDs in LED assembly 110, and it may include the connection between the mains and all the electronics in the lamp, including the driver. The electrical path includes the electrical connection between the driver and the LEDs. Electrical conductors form part of the electrical path between the LEDs and the lamp electronics to carry both sides of the supply to provide critical current to the LEDs.

An electronics housing 120 may be provided that contains the lamp electronics 119 used to drive and control the LEDs 130 that make up LED assembly 110 such as driver 128, rectifiers, regulators, timing circuitry, and other components. In existing LED lighting devices the lighting device comprises an LED driver 128 that is typically mounted on a lamp electronics board. The feed lines 116 from junction box 112 are electrically coupled to the lamp electronics 119 to provide current to the lamp for powering the LEDs 130. The LED driver 128 receives AC power from source 117. The driver 128 converts the incoming AC power to the proper DC voltage, and regulates the current flowing to the LEDs. The lamp electronics board may include electronics in addition to the driver 128. The power output from the lamp electronics 119 is electrically coupled to the LED assembly 110 by electrical connectors 121 such as wires that may be contained in conduit 118.

The lamp electronics 119 may also comprise a dimming circuit 129 for controlling the dimming of the LEDs 130. Generally speaking the amount of current flowing through an LED device determines the light output such that brightness (or dimming level) may be controlled by controlling the current passing through the layers of semiconductor material. The driver 128 may dim the LEDs using pulse-width modulation (PWM) where the current sent through an LED is switched on and off at a high frequency, amplitude modulation (AM) or the LEDs may be dimmed through constant current reduction (CCR). CCR maintains a continuous current to the source, but it reduces its amplitude to achieve dimming which may cause a color shift of the LEDs. PWM avoids color shift by operating the LED at its rated current level and at zero current. Combinations of AM and PWM may also be used. While the driver 128 and the dimmer circuit 129 are represented as separate blocks in FIG. 4, the functionality of the dimming circuit and the driver may be incorporated in a single circuit as part of the same physical component.

Suitable power supplies and drivers are described in U.S. Pat. No. 8,810,144 issued to Hu et al. on Aug. 19, 2014 and titled "Driver Circuits for Dimmable Solid State Lighting Apparatus" which is incorporated herein by reference in its entirety; U.S. Pat. No. 8,476,836 issued to van de Ven et al. on Jul. 2, 2013 and titled "AC Driven Solid State Lighting Apparatus with LED String Including Switched Segments" which is incorporated herein by reference in its entirety; U.S. Pat. No. 8,742,671 issued to van de Ven et al. on Jun. 3, 2014 titled "Solid State Lighting Apparatus and Methods of Using Integrated Driver Circuitry" which is incorporated herein by reference in its entirety; U.S. Pat. No. 9,101,021 issued to Lys on Aug. 4, 2015 titled "Solid-State Lighting Apparatus and Methods Using Parallel-Connected Segment Bypass Circuits" which is incorporated herein by reference in its entirety; U.S. Pat. No. 9,131,561 issued to Athalye on Sep. 8, 2015 titled "Solid-State Lighting Apparatus and Methods Using Energy Storage" which is incorporated herein by reference in its entirety; U.S. Pat. No. 9,510,413 issued to Athalye et al. on Nov. 29, 2016 titled "Solid State Lighting Apparatus and Methods of Forming" which is incorporated herein by reference in its entirety; U.S. Pat. No. 8,823,271 issued to van de Ven et al. on Sep. 2, 2014 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. Pat. No. 8,791,641 issued to van de Ven et al. on Jul. 29, 2014 titled "Solid-State Lighting Apparatus and Methods Using Energy Storage" which is incorporated herein by reference in its entirety.

Any of the embodiments disclosed herein may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. Pat. No. 9,791,110 issued to Hu et al. on Oct. 17, 2017 entitled "High Efficiency Driver Circuit with Fast Response" which is incorporated by reference herein in its entirety, or U.S. Pat. No. 9,303,823 issued to Hu et al. on Apr. 5, 2016 entitled "SEPIC Driver Circuit with Low Input Current Ripple" which is incorporated by reference herein in its entirety. Additionally, any of the embodiments described herein can include driver circuitry disclosed in U.S. Pat. No. 9,730,289 issued to Hu et al. on Aug. 8, 2017 titled "Solid State Light Fixtures Having Ultra-Low Dimming Capabilities and Related Driver Circuits and Methods", filed on Feb. 8, 2016 which is incorporated by reference herein in its entirety.

Control of the dimming of the LEDs 130 may operate either by an external signal or by internal controls or by a combination of both. For example, dimming may be controlled by receiving a signal from an ambient light detector (not shown), or dimming may be controlled internally as a power saving or thermal management tool. For example, the power to the LEDs may be reduced if an overtemperature situation is detected by sensor 136. The dimming level may also be controlled by an external signal from a lighting control 134. The lighting control 134 may be connected to the lighting device 100 over a lighting control network 138 or the like via communication interface 135 such that the communication interface can receive lighting control signals from the lighting control.

The LED assembly 110 comprises least one and typically a plurality of LEDs 130, such as individual LED chips, LED packages or the like, which collectively define an LED assembly 110 that serves as a light source for the light fixture. The LEDs 130 may be mounted on and electrically coupled to an electrically conductive LED board 122 such as a printed circuit board (PCB), metal core printed circuit board (MCPCB), lead frame structure, flex circuit or the like, or combinations of such structures. In some embodiments the LEDs 130 are mounted on an LED board 122 such as a PCB where the LED board forms part of the electrical path to the LEDs. The LED board 122 may be mounted on and is thermally coupled to the heatsink structure 108 to dissipate heat from the LEDs 130. A lens 124 may cover the exit opening 126 of the housing 102 such that the light is emitted in a controlled manner. In FIG. 2 the lens 124 is shown removed from the housing to show the LED assembly 110. In use the lens 124 is mounted to the lighting device 100 to receive light emitted by the LEDs 130 and to emit the light from the lighting device. In one embodiment the lens 124 comprises a diffusive surface treatment that disperses the light with a desired beam angle. The support ring 106 may also function as a reflector where the inside surfaces of the support ring comprise a reflective material.

A multi-chip LED package may be used with embodiments of the invention and can include light emitting diode chips that emit hues of light that, when mixed, are perceived in combination as white light. Phosphors can also be used. Blue or violet LEDs can be used in the LED devices with the appropriate phosphor. LED devices can be used with phosphorized coatings packaged locally with the LEDs to create various colors of light. A lighting system using the combination of BSY and red LED devices referred to above to make substantially white light can be referred to as a BSY plus red or "BSY+R" system. In such a system, the LED device includes LEDs operable to emit light of at least two different colors. Such embodiments can produce light with a CRI of at least 70, at least 80, at least 90, or at least 95. A further detailed example of using groups of LEDs emitting light of different wavelengths to produce substantially white light can be found in issued U.S. Pat. No. 7,213,940, issued to van de Ven et al. on May 8, 2007 titled "Lighting Device and Lighting Method" which is incorporated by reference herein in its entirety.

As used herein, the term LED may comprise packaged LED chip(s) or unpackaged LED chip(s). The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board. Depending on the embodiment, the lighting device can employ LED arrangements or lighting arrangements using remote phosphor technology as would be understood by one of ordinary skill in the art, and examples of remote phosphor technology are described in U.S. Pat. No. 7,614,759, issued to Negley on Nov. 10, 2009 titled "Lighting Device" which is incorporated by reference herein in its entirety. In some embodiments, each LED element or module or a plurality of such elements or modules may include one or more blue LEDs with a yellow or green phosphor and one or more blue LEDs with a red phosphor. The LEDs may be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. Other LED arrangements are possible.

In some embodiments, a string, a group of LEDs or individual LEDs can comprise different lighting characteristics and by independently controlling a string, a group of LEDs or individual LEDs, characteristics of the overall light out output of the device can be controlled. Embodiments of the present invention entail digital and/or analog communication between the controller 132 and the driver 128 that is supplying power to the LEDs. Details of suitable arrangements of the LEDs and lamp electronics for use in the light fixture 100 are disclosed in U.S. Pat. No. 9,786,639, issued to Bergmann et al. on Oct. 10, 2017 and titled "Solid State Light Fixtures Suitable for High Temperature Operation Having Separate Blue-Shifted-Yellow/Green and Blue-Shifted-Red Emitters", which is incorporated by reference herein in its entirety. In the embodiments disclosed herein a various combinations of LEDs of similar and different colors may be selected to achieve a desired color point. In one embodiment, the light source comprises any LED, for example, an MT-G LED incorporating TrueWhite® LED technology or as disclosed in U.S. Pat. No. 9,818,919, issued to Lowes et al. on Nov. 14, 2017, entitled "LED Package with Multiple Element Light Source and Encapsulant Having Planar Surfaces" by Lowes et al. which is hereby incorporated by reference herein in its entirety. In any of the embodiments disclosed herein the LEDs 130 may have a lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used as the light source. Various types of LEDs may be used, including LEDs having primary optics as well as bare LED chips. The LED elements may be disposed in different configurations and/or layouts as desired. Different color temperatures and appearances could be produced using other LED combinations, as is known in the art.

The LED board 122 includes a controller 132 for controlling the LEDs 130 and communicating with the driver 128. The controller 132 may comprise color control circuitry 131 for controlling the CCT of the emitted light. On example of color control circuitry is disclosed in U.S. Pat. No. 9,549,448, issued to Pope et al. on Jan. 17, 2017, titled "Lighting Fixture Providing Variable CCT" which is incorporated by reference herein in its entirety. While one system for controlling the color and luminous intensity of the LEDs is described any suitable color control circuitry may be used.

The term "controller" is used herein in the broadest sense. A controller can be a microcontroller, microprocessor, digital signal processor, embedded processor, programmed logic array, dedicated hard-wired circuitry, and may include various analog-to-digital converters, digital-to-analog converters, and other support circuits and/or combinations of the foregoing, or any other electronics used to perform control functions. The controller may comprise circuitry used for implementing the communication and/or logic functions of the system. Control and signal processing functions of the system may be allocated between different processing devices according to their respective capabilities.

As the phrase is used herein, the controller may be "configured to" perform a certain function in a variety of ways, including, for example, by having one or more general-purpose circuits perform the function by executing particular computer-executable program code embodied in computer-readable medium, and/or by having one or more application-specific circuits perform the function. If a programmable device such as a microcontroller is used, firmware, software, or microcode can be stored in a tangible medium that is associated with the device. The controller may further include functionality to operate one or more software programs based on computer-executable program code thereof, which may be stored in memory 133. The memory may be integrated into the controller, or it may be a memory chip that is addressed by the controller to perform control functions. Such firmware, software or microcode is executable by a controller and when executed, causes the controller to perform its control functions.

As used herein, a "memory" generally refers to a device or combination of devices that store one or more forms of computer-readable media for storing data and/or computer-executable program code/instructions for use by the controller. For example, in one embodiment, the memory devices described herein include any computer memory that provides an actual or virtual space to temporarily or permanently store data and/or commands provided to the processing device when the processing device carries out its functions described herein. As used herein, memory includes any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

In existing systems the network interface for communicating with the lighting control system and the intelligence for controlling dimming of the lighting device is put into the driver. The lighting control system delivers a control signal to the driver and the driver adjusts the power output to the LEDs to control the light output of the lighting device in accordance with the control signal. Because the network interface and intelligence for controlling the LEDs is in the driver, in order for the driver to control the CCT of the emitted light, the functionality of the driver and the LED board must be integrated. The integration of the driver and the LED board requires a specific driver for use with the LED assembly and limits the flexibility in designing a lighting system. Where the functionality of the driver and LED board are not integrated the intelligence for controlling the CCT of the emitted light must be on the LED board. As a result, the color control command for CCT must be communicated from the driver, which receives the control command over the network interface, to the LED board creating additional complexity in the lighting control system.

In the lighting device of the invention the communication interface 135 for communicating with the lighting control system is provided on the LED board 122 and communicates with the LED board controller 132 rather than with the driver 128 to control both CCT and brightness. Thus, the intelligence for controlling dimming and the color of the lighting device is on the LED board 122. The communication interface 135 receives a lighting control signal 150 that may include the dimming control command 152 and/or the color control command 154 directly from the lighting control network 138. If a dimming control command 152 is received the controller 132 transmits a driver control signal 156 over driver control interface 157 to the driver 128 that controls the output of the driver 128. If a color control command 154 is received, the controller 132 on the LED board 110 directly adjusts the CCT of the emitted light based on the color control command signal received at the communication interface 135.

For example, the color may be adjusted using selective string shunting. As shown in FIG. 4 four strings of LEDs 140, 141, 142 and 143, each having an LED color group, are provided. Switches are used to provide current to selected ones of the groups of LEDs to alter the color of the emitted light. In the illustrated embodiment two switches 144 and 145 are used and are controlled by controller 132 to selectively illuminate the groups of LEDs. In the illustrated embodiment switch 144 shunts between LED groups 140 and 141 and switch 145 shunts between LED groups 142 and 143. In some embodiments the color of the light may be adjusted in conjunction with the dimming of the light where, for example, when the lumen output of the lamp is lowered, i.e. the lamp is dimmed, the color of the light is made progressively warmer such that as the light is dimmed the light gradually changes color from white to yellow to yellow-orange. However, the adjustment of the color and the adjustment of the dimming levels may be made independently of one another. Moreover, the color of the emitted light may be other than the colors specifically described herein.

The communication interface 135 communicates with a lighting control 134 that is capable of transmitting the lighting control signals 150 to the lighting device 100 for controlling the operation of the lighting device. The lighting control 134 may comprise a variety of user devices and may be, for example, a control panel that forms part of a smart building grid, a smart phone, tablet, personal computer or the like, a remote dedicated terminal or other user device capable of transmitting control signals to the lighting device. In some embodiments the lighting control 134 may control a single lighting device 100 such that the lighting network 138 comprises a dedicated communication channel between the lighting control 134 and the lighting device 100 such as a hardwired connection. In other embodiments the lighting control 134 may communicate with a plurality of lighting devices over lighting network 138. In such an arrangement the lighting control 134 may control a plurality of lighting devices and the lighting devices may be individually addressable. The lighting network 138 may comprise any suitable communication channels and protocols.

Figure 8:
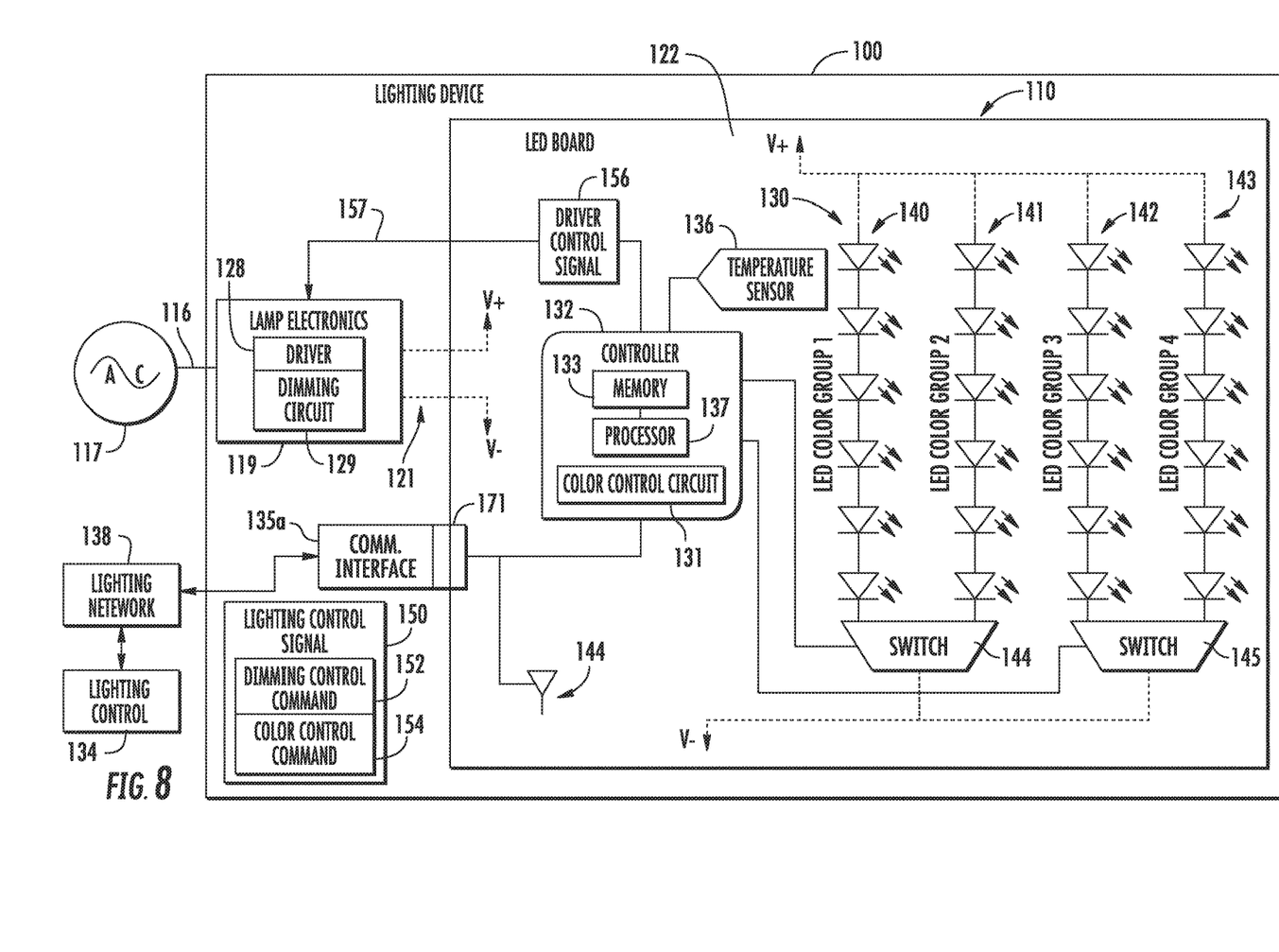
FIGS. 8 and 9 are a schematic views of other embodiments of a lighting device according to the invention.

In some embodiments an antenna 144 may be provided in the lighting device 100 for receiving, and/or transmitting, a radio signal or other wireless signal between the communication interface 135 and the lighting control system and/or between lighting devices. The antenna 144 may convert the radio signal or other wireless signal to an electronic signal that may be delivered to the communication interface 135 for controlling operation of the lamp. The antenna 144 may be mounted on the LED board 122 as shown in FIG. 8 or in some embodiments the antenna and related electronics may be positioned inside of a communication module 145 that is supported on the support structure 102 as shown in FIG. 4 where the antenna communicates with the communication interface 135 on the LED board 122. The communication module 145 may also support sensors such as ambient light sensors, occupancy sensors or the like. In various embodiments described herein various smart technologies may be incorporated in the lamps as described in the following United States patent applications "Solid State Lighting Switches and Fixtures Providing Selectively Linked Dimming and Color Control and Methods of Operating," U.S. Pat. No. 8,736,186, issued May 27, 2014, which is incorporated by reference herein in its entirety; "Master/Slave Arrangement for Lighting Fixture Modules," U.S. Pat. No. 9,572,226, issued Feb. 14, 2017, which is incorporated by reference herein in its entirety; "Lighting Fixture for Automated Grouping," U.S. Pat. No. 9,155,165, issued Oct. 6, 2015, which is incorporated by reference herein in its entirety; "Multi-Agent Intelligent Lighting System," U.S. Pat. No. 8,975,827, issued Mar. 1, 2013, which is incorporated by reference herein in its entirety; "Routing Table Improvements for Wireless Lighting Networks," U.S. Pat. No. 9,155,166, issued Oct. 6, 2015, which is incorporated by reference herein in its entirety; "Commissioning Device for Multi-Node Sensor and Control Networks," U.S. Pat. No. 9,433,061, issued Aug. 30, 2016, which is incorporated by reference herein in its entirety; "Wireless Network Initialization for Lighting Systems," U.S. Pat. No. 8,829,821, issued Sep. 9, 2014, which is incorporated by reference herein in its entirety; "Commissioning for a Lighting Network," U.S. Pat. No. 8,912,735, issued Dec. 16, 2014, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," U.S. Pat. No. 9,622,321, issued Apr. 11, 2017, which is incorporated by reference herein in its entirety; and "Enhanced Network Lighting," Application No. 61/932,058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

While in some embodiments an RF signal may be used to communicate with the lighting device via an antenna, in other embodiments other technologies may be used. For example communication with the lighting device may be made using Digital Addressable Lighting Interface (DALI) where the lighting control 134 monitors and controls the lighting device using a bi-directional data exchange over a single pair of wires that comprise the bus used for communication to all devices on a DALI network. An alternative to DALI is 0-10V lighting control system where a manual control such as a push button or dimmer switch functions as the lighting control 134 may be used to control the light output of the lighting device 100. In such embodiments, the lighting network may simply comprise a hardwire connection between the lighting control 134 and the lighting device 100. In other embodiments, the DMX512 standard for digital communication networks may be used to communicate the lighting control 134 with the lighting device. In still other embodiments communication with the lighting device may be made using Bluetooth or WiFi. If Bluetooth or WiFi are used as the communication mechanism an application for communication with the lighting device may be installed on a user's smartphone, tablet or other communication device. The lighting network 138 may include a wireless local area network (WLAN) such as WiFi based on the Institute of Electrical and Electronics Engineers (IEEE) 802.11 standards, Bluetooth short-wavelength UHF radio waves in the ISM band from 2.4 to 2.485 GHz or other wireless access technology. A mobile device may connect to the network 138 by a cellular telecommunications network or by WiFi, Bluetooth or other access technology. The network 138 may include a local area network (LAN), a wide area network (WAN), and/or a global area network (GAN). The network 138 may provide for wireline, wireless, or a combination of wireline and wireless communication between devices in the network. In some embodiments, the network 138 may include the Internet, a wireless telephone network and/or the public switched telephone network.

Figure 9:
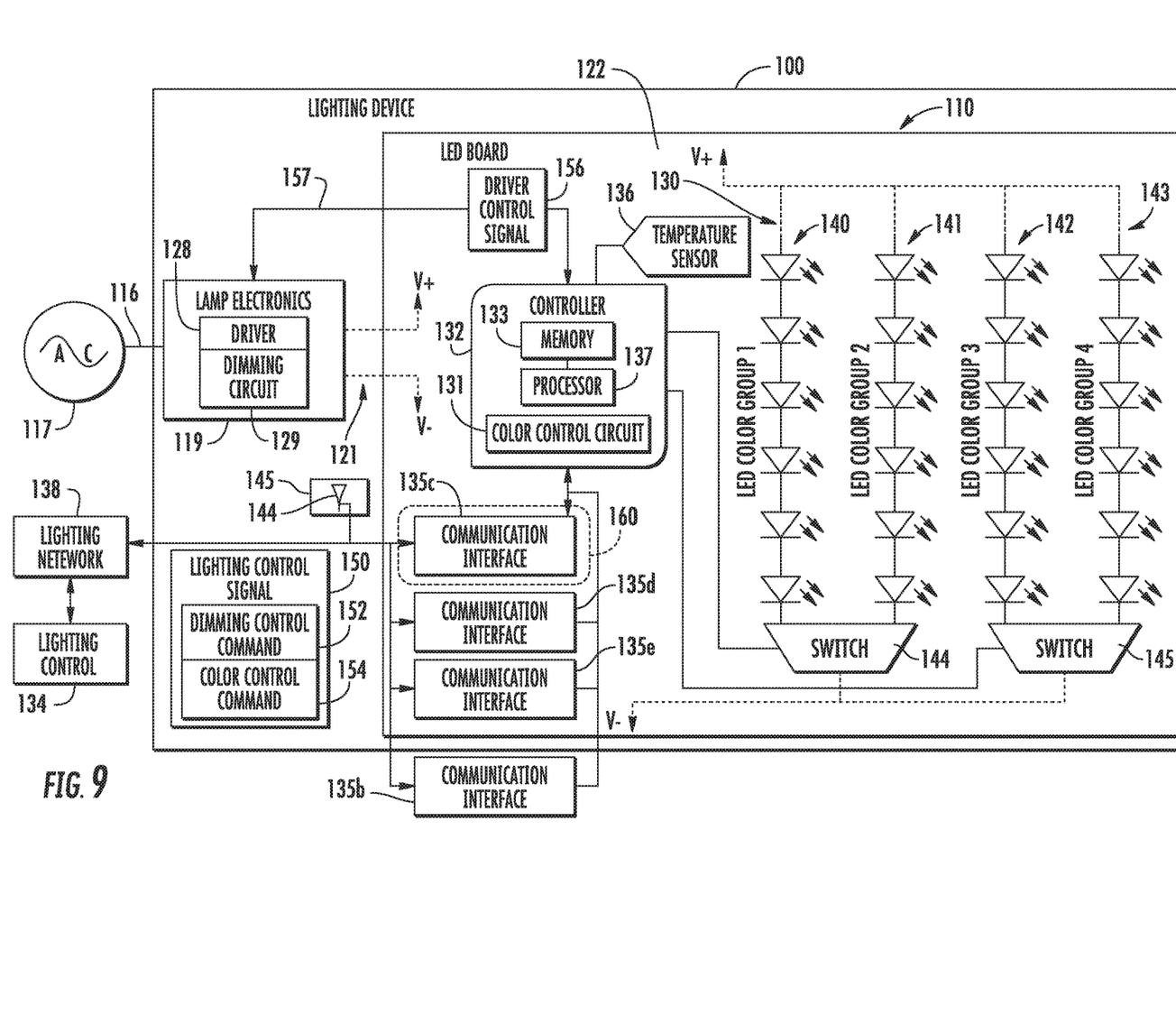

The communication interface 135 functions to communicate between the lighting control 134 and controller 132 and may employ any suitable communication protocol and/or physical layers to provide the communication functionality. In the embodiment of FIG. 4 the communication interface 135 is shown on the LED board 122 where the communication interface is dedicated to receive and communicate the lighting control signal 150 to the controller 132. In some embodiments, the LED board may comprise a daughter board 160 on which the communication interface 135 is mounted where the daughter board 160 is connected directly to the main LED board 122 on which the LEDs 130 are mounted as shown in FIG. 9. Use of a daughter board for the communication interface 135 allows the LED board to be easily configured for different communication protocols, physical layers and/or carriers. The daughter board 160 is represented by a dashed line in FIG. 9 where once connected to the LED board the daughter board is considered to be a part of the LED board 122. The daughter board may be eliminated such that he communication interface 135 is on the same physical board that supports the LEDs 130 as shown, for example, in FIG. 4.

Referring to FIG. 8, in some embodiments the communication interface 135a may be a plug-in module that connects to a port 171 on the LED board 122 such that different communication modules may be connected to the LED board to provide the suitable communication interface between the controller and the 132 lighting control network 138. Referring to FIG. 9, in some embodiments a plurality of the communication interfaces 135c, 135d, 135e may be provided on the LED board 122 where each different communication interface may be provided to provide the suitable communication interface for different communication protocols and/or physical layers. The communication interface 135b may also reside of off the LED board provided that the communication interface can communicate the lighting control signal between the lighting network and the LED board controller 132. For example a communication interface may reside in the communication module 145. In all of these embodiments, the LED board controller 132, rather than driver, receives the lighting control signals from the communication interface and the LED board controller 132 is responsible for instructing the driver to adjust brightness levels using driver control signal 156. It is to be understood that the different arrangements shown in the various embodiments described herein may be used in combinations other than as specifically shown.

The lighting control 134 transmits a lighting control signal 150 to the lighting device 100. The lighting control signal 150 may comprise a dimming control command signal or message 152 and/or a color control command signal or message 154. In some embodiments the lighting control signal 150 may comprise other command messages, information and/or requests for the lighting device 100. The communication interface 135 receives the lighting control signal 150. Upon reception of a dimming control command 152, the controller 132 on the LED board generates a driver control signal 156 based on the dimming control command 152 received at the network interface 135 and transmits the driver control signal 156 to the driver 128 over driver control interface 157. The driver 128 receives the driver control signal 156 from the LED board controller 132 and adjusts the power output of the driver 128 to the LED board to control the dimming level of the LEDs 130. The driver control interface 157 for adjusting dimming may be a simpler communication interface than that used on the overall lighting control network 138 such that the driver 128 can be simpler and less expensive device than if the driver 128 receives both the dimming control command and the color control command. For example in one embodiment the lighting network 138 uses a DALI bus that communicates with the LED board while the LED board generates a 0-10V or PWM signal as the driver control signal 156 to the driver 128.

Upon reception of a color control command 154, the controller 132 on the LED board 110 directly controls the LEDs 130 based on the color control command received at the communication interface 135 to adjust the color of the emitted light. The driver 128 may not be involved in the color adjustment such that the driver does not have to be integrated with the LED board nor does the driver have to include the intelligence to adjust the color of the emitted light. As a result the driver may be a simpler and less expensive device than those currently used in color adjustable lighting devices. Because the network communication capability is moved to the LED board 122 the lighting device can be provided with both color and dimming control while using a relatively inexpensive off the shelf driver. Because the LED board is not paired to the driver the design of the lighting device may use any suitable driver.

In some embodiments, a single signal may be received where the controller controls both color and dimming level based on the received lighting control signal. For example, the LEDs may be dimmed following the profile of color vs. brightness exhibited by incandescent lamps. In such a system the lighting control 134 is used to set a dimming level, such as via a user operated dimmer switch, and the color of the emitted light is adjusted automatically by the controller 132 using a stored color v. brightness profile stored in memory 133. As previously described, the color of the emitted light and the dimming level of the emitted light may be controlled independently based on separate lighting control signals received from the lighting control 134. In some embodiments, the user may manually control both the color and the brightness of the emitted light. One example of such a system may be the lighting in a hotel room where the room may function both as living area and a work space. The user may want a bright white light when the room is sued as a work space but a warmer white light when the room is used as a living space. In such an arrangement the user may operate a lighting control to control the color of the emitted light and the brightness of the emitted light independently. The system of the invention may also operate in different modes where in some modes the user controls both color and brightness and in other modes one of the color and brightness are controlled automatically.

It is to be understood that the lighting control signal may transmit the dimming control command and the color control command separately or as part of a single lighting control signal. Moreover, the same physical signal may be used as both the dimming control command and the color control command where the controller interprets the signals as one of a dimming control command and a color control command. For example, where a dimmer switch is used as the lighting control and a 0-10V signal is used as the physical layer, the controller may interpret one 0-10V signal as a dimming control command and another 0-10V signal as a color control command. For example, a typical dimmer switch has an on/off switch, such as a push button, and a movable dimmer control such as a slide lever or rotating knob. The controller 132 may be configured such that movement of the dimmer control normally operates to send a 0-10V signal to the controller 132 that is interpreted as a dimming control command. However, the controller 132 may be further configured such that if the user toggles the on/off switch two times in rapid succession, the controller interprets the next 0-10V signal as a color control signal such that the user may control the color of the emitted light using the same physical controller and the same 0-10V signal. In other more robust systems separate and distinct dimming control commands and color control commands may be used.

Figure 5:
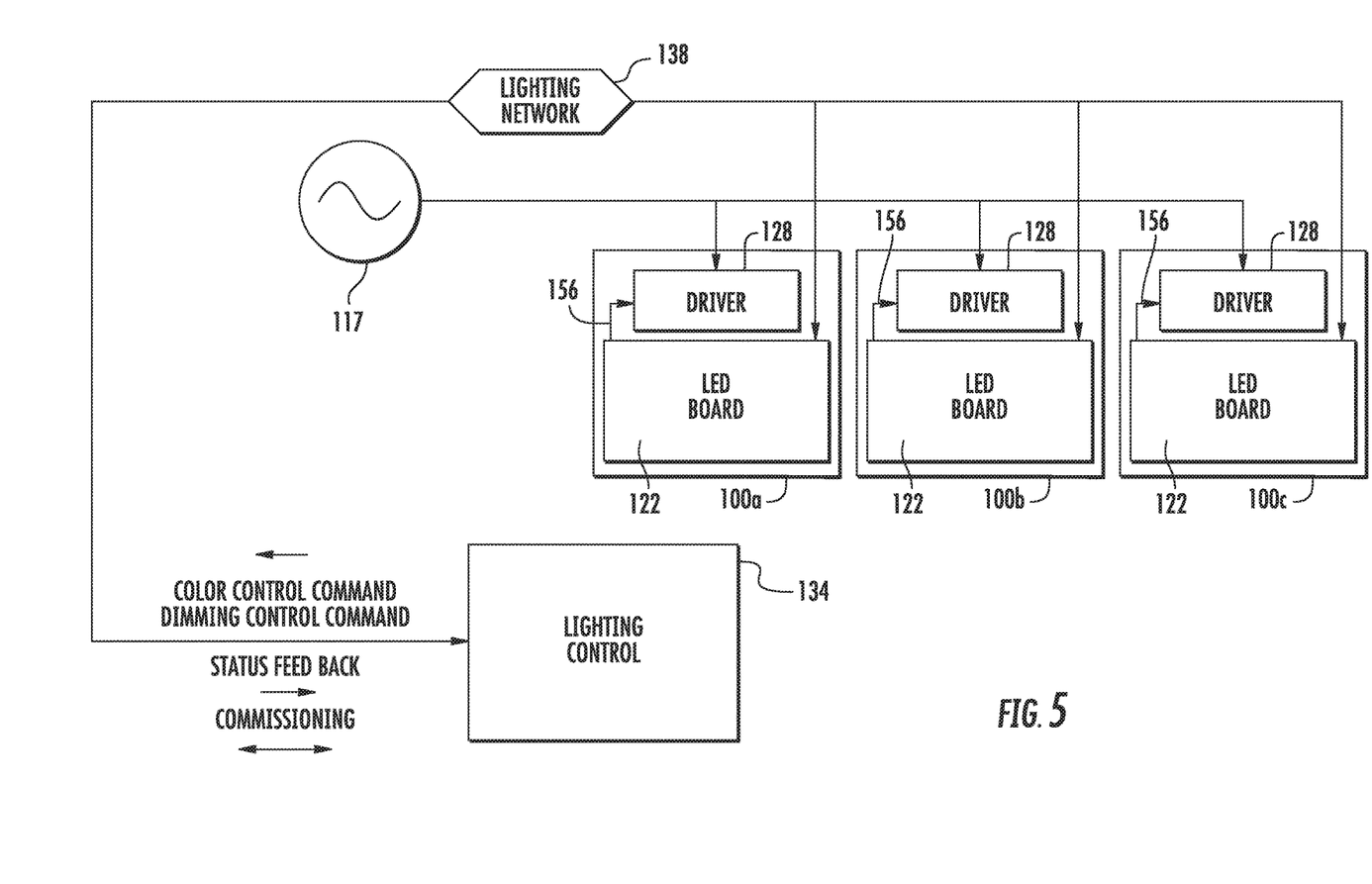
FIG. 5 is a schematic view of the lighting devices of the invention in a first embodiment of a networked configuration.

Referring to FIG. 5 one embodiment of a network lighting system is shown where the lighting control 134 is connected to a plurality of lighting devices 100*a*, 100*b* and 100*c* over a lighting network 138. While three lighting devices are show a greater or fewer number of lighting devices may be controlled by the lighting control 134. For example, the lighting control 134 may comprise a control panel that forms part of a buildings smart grid and the lighting network 138 may comprise a DALI bus where the bus is connected to and communicates with each of the lighting devices 100*a*, 100*b* and 100*c*. Specifically, the bus is connected to the communication interface 135 on the LED board 122 of each of the lighting devices. A power source 117 is connected to the driver 128 of each of the lighting devices to provide critical current used by the driver to supply current to the LED board 122 of each of the lighting devices. Color control commands 154 and dimming control commands 154 may be sent to the light fixtures 100*a*, 100*b* and 100*c* over the lighting network 138 to control the color and dimming levels of the lighting devices. A driver control signal 156 transmits the dimming signal from the LED board 122 to the driver 128. In one embodiment the driver control signal 156 may comprise a 0-10V signal such that the communication between the LED board and the driver is simpler than the network channel. The lighting network 138 connection can provide two-way communication with the lighting control 134 such that the lighting devices 100*a*, 100*b* and 100*c* can provide status feedback to the control panel. The lighting network 138 may also be used as a two-way communication channel for commissioning the lighting devices.

Figure 6:
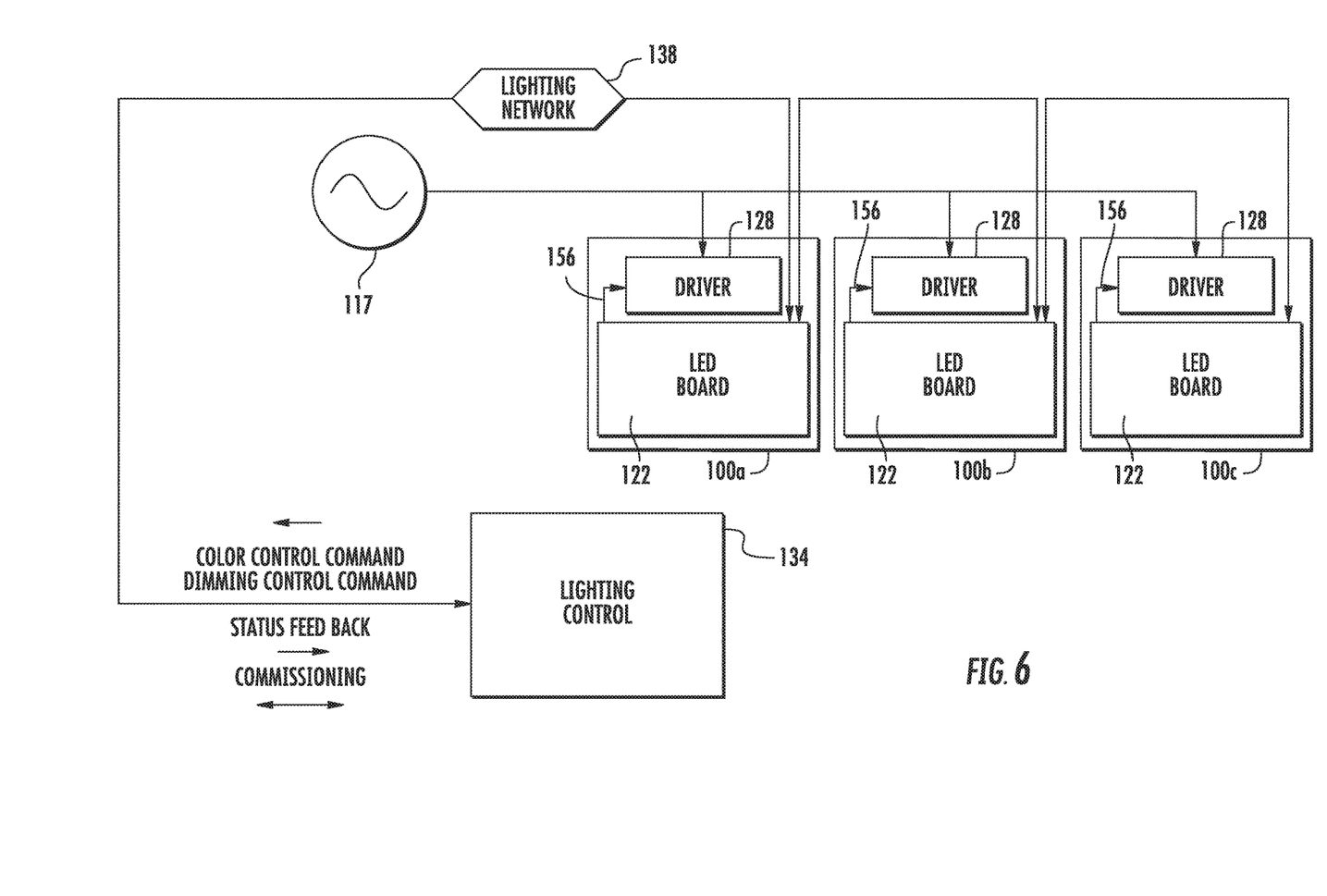
FIG. 6 is a schematic view of the lighting devices of the invention in a second embodiment of a networked configuration.

FIG. 6 shows another embodiment of a network lighting system where lighting control 134 is connected to a first lighting device 100*a* of a plurality of lighting devices 100*a*, 100*b* and 100*c* over lighting network 138. Specifically, the lighting control 134 communicates with the communication interface 135 on the LED board 122 of the lighting device 100*a*. The communication interface of the first lighting device 100*a* communicates with the communication interface of the second lighting device 100*b* such that a master slave relationship is established between the lighting devices. Likewise, the communication interface of the second lighting device 100*b* communicates with the communication interface of the third lighting device 100*c*. A power source 117 is connected to the driver 128 of each of the lighting devices to provide critical current used by the driver to feed the LEDs of each of the lighting devices. Color control commands and dimming control commands may be sent to the lighting devices to control the color and dimming levels of the lighting devices as previously described. The lighting network 138 connection can provide two-way communication with the lighting control 134 such that the lighting devices 100*a*, 100*b* and 100*c* can provide status feedback to the control panel. The lighting network 138 may also be used as a two-way communication channel for commissioning the lighting devices.

Figure 7:
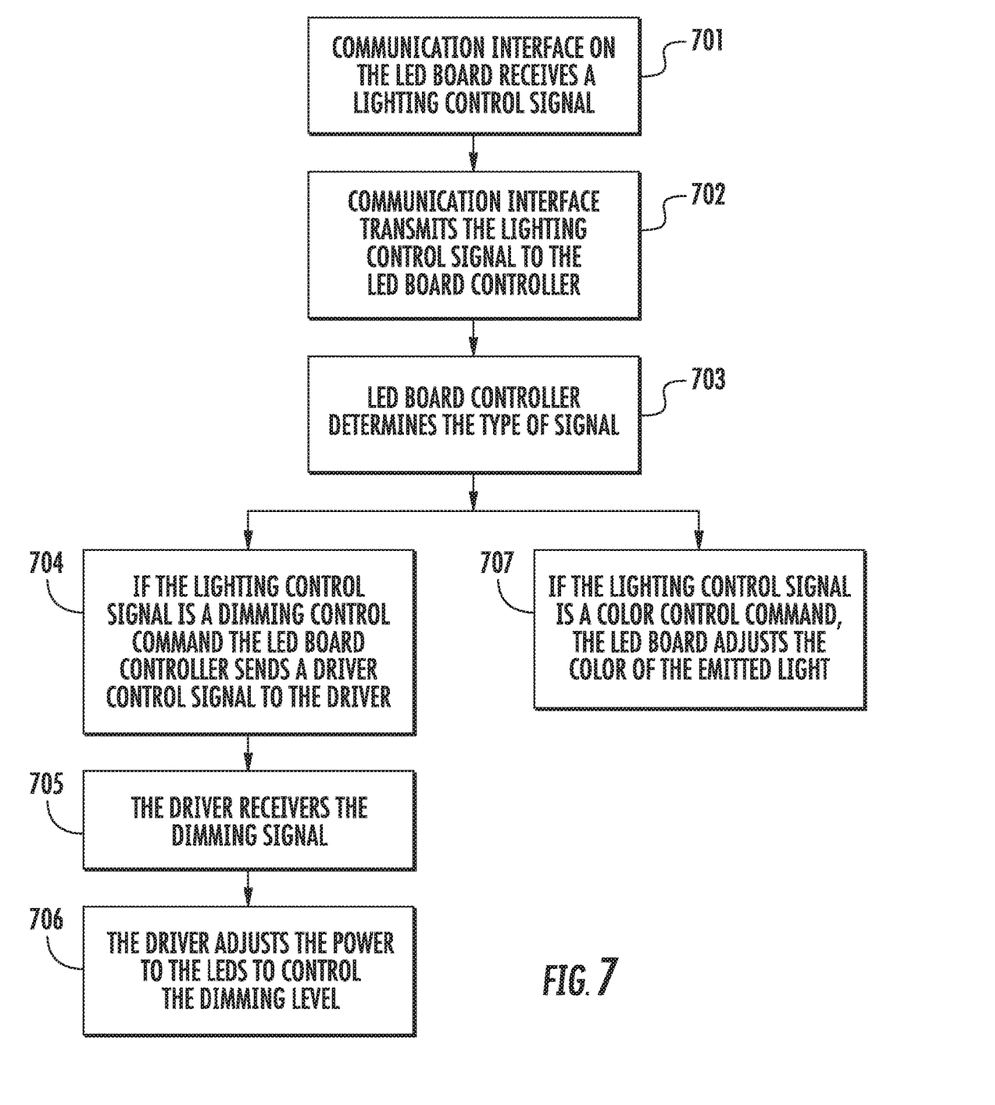
FIG. 7 is a flow chart illustrating an embodiment of a method of operating the lighting device of the invention.

In an embodiment of a method of operating the lighting device a lighting control signal is transmitted to the communication interface at the LED board of a lighting device. The communication interface receives the lighting control signal at the communication interface on the LED board (Block 701). At least one of a dimming control signal and a color control signal may be transmitted to the communication interface. As previously described the communication interface may be one of, but not limited to, a DALI interface, a DMX512 interface, a Bluetooth interface, a 0-10V interface, and a wireless interface. The communication interface sends the received lighting control signals to the LED board controller (Block 702). Based on the internal logic of the LED board controller, the LED board controller determines the type of lighting control signal and the appropriate response (Block 703). If the control signal is a dimming control command the LED board controller transmits a driver control signal to the driver (Block 704). The dimming signal may comprise, for example, one of a 0-10V and a PWM signal. The driver receives the dimming signal (Block 705). The driver adjusts the power delivered to the LED board based on the dimming signal to control the brightness of the emitted light (Block 706). If the control signal is a color control command the LED board controller adjusts the color of the emitted light by selectively operating different color LEDs as programmed in the LED board controller based on the color control signal (Block 707). For example selected groups of LEDs that emit light of different colors may be energized to obtain the desired color of emitted light. Where plural lighting devices are controlled a dimming control signal and/or a color control signal may be transmitted to the communication interfaces on the LED boards of the additional lighting devices.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A lighting device comprising:
   an LED board comprising: (i) a communication interface configured to receive a lighting control signal from an external lighting control and (ii) a controller communicating with the communication interface;
   at least one LED mounted on the LED board, the at least one LED operable to emit light when energized through an electrical path, the controller comprising color control circuitry that directly adjusts a color of the light based on the lighting control signal;
   a driver remote from the LED board for delivering current to the at least one LED via the electrical path to control a dimming level of the at least one LED independently of the color of the light emitted by the at least one LED; and
   a driver control interface for transmitting a driver control signal to the driver based on the lighting control signal received at the controller for controlling the dimming level.

2. The lighting device of claim 1 wherein the communication interface comprises at least one of a DALI interface, a DMX512 interface, a Bluetooth interface, a 0-10V interface, and a wireless interface.

3. The lighting device of claim 1 wherein the at least one LED comprises at least two LEDs wherein selected ones of the at least two LEDS emit light of at least two different colors.

4. The lighting device of claim 1 wherein the at least one LED comprises at least two groups of LEDs wherein a first group of the at least two groups of LEDs emits light of a first color and a second group of the at least two groups of LEDs emits light of a second color.

5. The lighting device of claim 1 wherein the communication interface receives at least one of a color control command and a dimming control command.

6. The lighting device of claim 5 wherein the driver control interface transmits the driver control signal to the driver upon receipt of the dimming control command.

7. The lighting device of claim 5 wherein the driver control signal comprises one of a 0-10V and a PWM signal.

8. The lighting device of claim 1 wherein the communication interface communicates with a RF module.

9. The lighting device of claim 1 wherein the LED board comprises a daughter board on which the communication interface is mounted.

10. A lighting device network comprising:
    a plurality of lighting devices, each of the plurality of lighting devices comprising:
    an LED board comprising: (i) a communication interface configured to receive a lighting control signal from an external control and (ii) a controller communicating with the communication interface;
    at least one LED mounted on the LED board, the at least one LED operable to emit light when energized through an electrical path, the controller comprising color control circuitry that directly adjusts a color of the light based on the lighting control signal;
    a driver separate from the LED board for delivering current to the at least one LED via the electrical path to control a dimming level of the at least one LED independently of the color of the light emitted by the at least one LED; and
    a driver control interface for transmitting a driver control signal from the controller to the driver based on the lighting control signal received at the controller for controlling the dimming level.

11. The lighting device of claim 10 wherein the communication interfaces of each of the plurality of lighting devices are connected by a lighting network.

12. The lighting device of claim 11 further comprising a lighting control in communication with at least one of the plurality of lighting devices over the lighting network.

13. The lighting device of claim 11 further comprising a lighting control in communication with each of the plurality of lighting devices over the lighting network.

14. A method of operating a lighting device comprising:
    Receiving at least one of a dimming control command and a color control command at a communication interface on an LED board the communication interface communicating with a controller, the LED board comprising a plurality of LEDs operable to emit light when energized through an electrical path, transmitting a color control signal from the controller directly to the plurality of LEDs to adjust a color of the emitted light based on the color control command; transmitting a driver control signal to a driver remote from the LED board upon receipt of the dimming control command, the driver delivering current to the at least one LED via the electrical path based on the driver control signal to control a dimming level of the plurality of the LEDs.

15. The method of claim 14 wherein the communication interface comprises at least one of a DALI interface, a DMX512 interface, a Bluetooth interface, a 0-10V interface, and a wireless interface.

16. The method of claim 14 wherein selected ones of the plurality of LEDS emit light of at least two different colors.

17. The method of claim 14 wherein the plurality of LEDs comprises at least two groups of LEDs wherein a first group of the at least two groups of LEDs emits light of a first color and a second group of the at least two groups of LEDs emits light of a second color.

18. The method of claim 14 further comprising transmitting the at least one of a dimming control command and a color control command to a second communication interface on a second LED board.

19. The method of claim 14 further comprising transmitting the at least one of a dimming control command and a color control command from the communication interface to a second communication interface on a second LED board.

20. A lighting device comprising:
- a communication interface for communicating with an external lighting control;
- an LED board;
- at least one LED and the communication interface mounted on the LED board, the at least one LED operable to emit light of a brightness and a color when energized through an electrical path;
- a controller on the LED board, the communication interface communicating with the controller, the controller directly controlling the color of the emitted light independent of the brightness;
- a driver remote from the LED board for delivering current to the at least one LED via the electrical path to control the brightness of the emitted light independent of the color;
- a driver signal interface between the controller and driver for transmitting driver control signals from the controller to the driver for controlling the brightness of the emitted light.

* * * * *